United States Patent [19]

Weinger

[11] 4,021,841
[45] May 3, 1977

[54] COLOR VIDEO SYNTHESIZER WITH IMPROVED IMAGE CONTROL MEANS

[76] Inventor: Ralph Weinger, 7819 Deer Run Road, Philadelphia, Pa. 19118

[22] Filed: Dec. 31, 1975

[21] Appl. No.: 645,633

[52] U.S. Cl. .............................. 358/22; 178/DIG. 6; 358/230
[51] Int. Cl.² ...................................... H04N 5/22
[58] Field of Search .................. 178/6, 6.8, 7.1, 7.2, 178/DIG. 6; 358/22; 328/188

[56] References Cited
UNITED STATES PATENTS 3,764,732  10/1973  Macheboeuf ................. 178/DIG. 6

Primary Examiner—Robert L. Richardson

Attorney, Agent, or Firm—Woodcock Washburn Kurtz & Mackiewicz

[57] ABSTRACT

In a video synthesizer for generating programmable graphics, moving elements and the like, a subsystem for generating a video signal wherein a predetermined generated function is displayed in a selected manner as a function of a predetermined video signal. The video control signal, which suitably represents a graphic character or characters, and may be stationary or moving, is used for starting and stopping a function generator whereby a composite video signal is obtained. The video signal may be further processed by level assignment and color selection to produce the desired color video signal.

17 Claims, 4 Drawing Figures

COLOR VIDEO SYNTHESIZER WITH IMPROVED IMAGE CONTROL MEANS

BACKGROUND OF THE INVENTION

1. Field of the Invention

This invention relates to video synthesizers and, more particularly, to video synthesizers for producing video signals derived as a combination of an input image signal and a function generator.

2. Description of the Prior Art

The use of video synthesizers is a well established and accepted technique in the television industry. Video synthesizers are commercially available, but as a practical matter are sufficiently expensive that they are available only to a very limited market. Prior art synthesizers are generally designed to generate predetermined video patterns, and as a general proposition a wide range of patterns can be synthesized. However, for a hard-wired synthesizers, the number of available video functions or patterns is necessarily limited. More complex synthesizers utilize computer control, which provides a great deal of flexibility but at a concomitant considerable cost. Not only is the computer unit itself expensive, but the required software necessary for programming the unit is very expensive.

There is a great portion of the television industry which could benefit from a relatively low cost video synthesizer having a degree of programming flexibility, which segment of the market is presently excluded for economic reasons from use of higher priced synthesizers. For example, industrial TV studios, educational institutions, and the like have a great need in producing television programming for aids in providing animated presentations, moving graphics, and the like. Heretofore, such presentations have been available only through the use of the much higher cost synthesizer equipment, or extensive artwork such as is used in conventional animated television productions. What has been long needed in this area, and what is provided by this invention is means for providing the television user with a medium whereby a rather limited amount of artwork can be combined with a relatively inexpensive video synthesizer to provide a great flexibility in producing television displays characterized by moving illustrations, changing color, etc.

SUMMARY OF THE INVENTION

It is an object of this invention to provide relatively inexpensive video synthesizer equipment which provides substantial operator capability and flexibility in generating dynamic video graphics.

It is an object of this invention to provide a method and circuit means for generating video signals which are controlled in accordance with an image or images of a type which are easily and conveniently produced in a television studio, such as by production of one or more art cards. The resulting video signals represent a selected video function which is programmed to appear on the screen in a manner that is prescribed by logic selection performed within the circuit means, as well as by operator manipulation of the image or images.

It is a further object of this invention to provide reliable and easy-to-operate means for programming generation of predetermined video pattern signals as a function of separately generated image control signals.

In accordance with the above objects, there is provided a video synthesizer for generating a video output signal wherein a predetermined generated function is displayed in a selected manner as a function of a separate video image signal. The video image signal is processed to obtain a control signal for controlling the off-on operation of one or more video generators, and the resulting signals are utilized in synthesizing a multi-level color video signal. The means for processing the video image signal contains logic circuitry for providing a plurality of control configurations for any given image source.

DESCRIPTION OF THE PREFERRED EMBODIMENT

Figure 1:
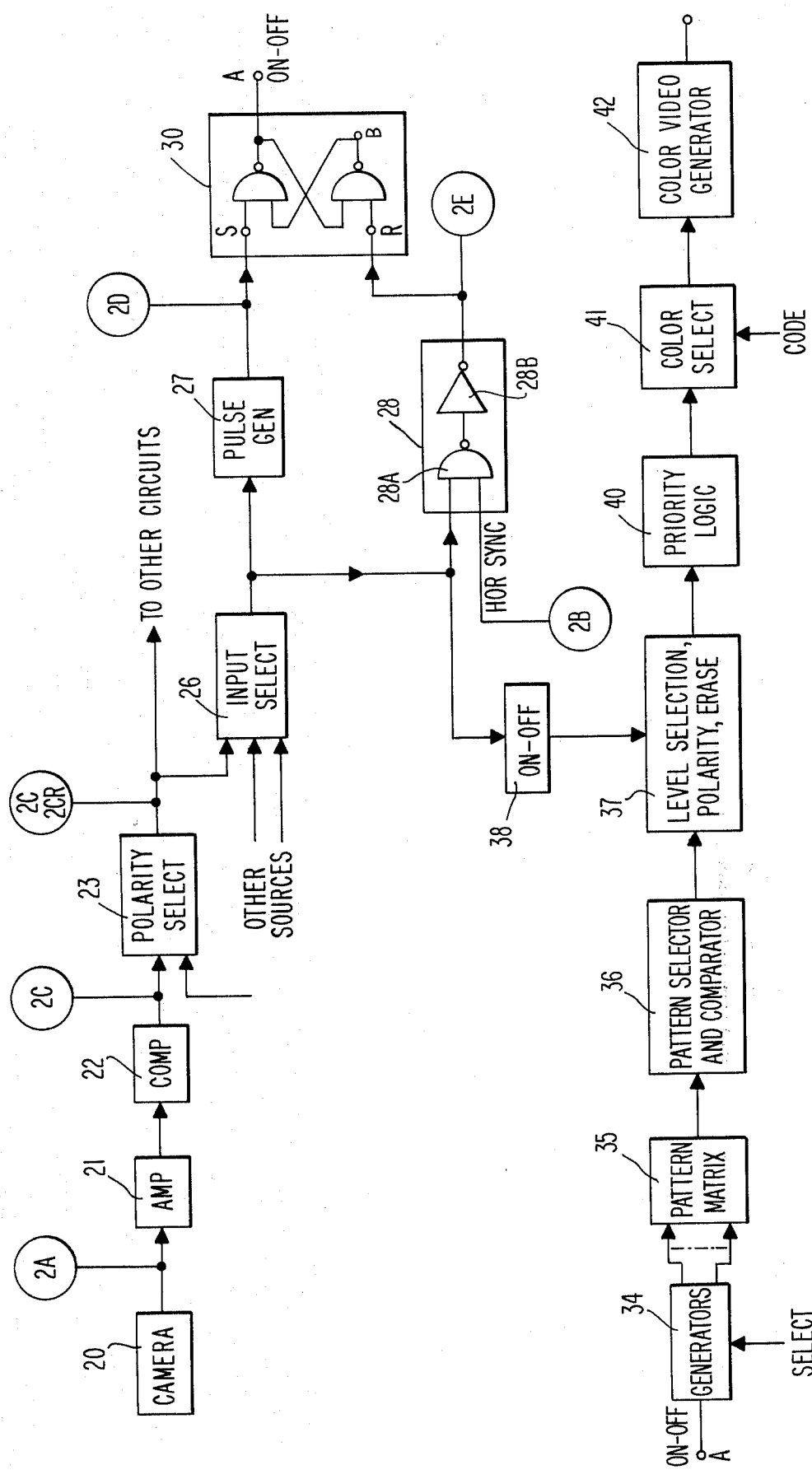
FIG. 1 is a block diagram of the system of this invention.
Figure 2:
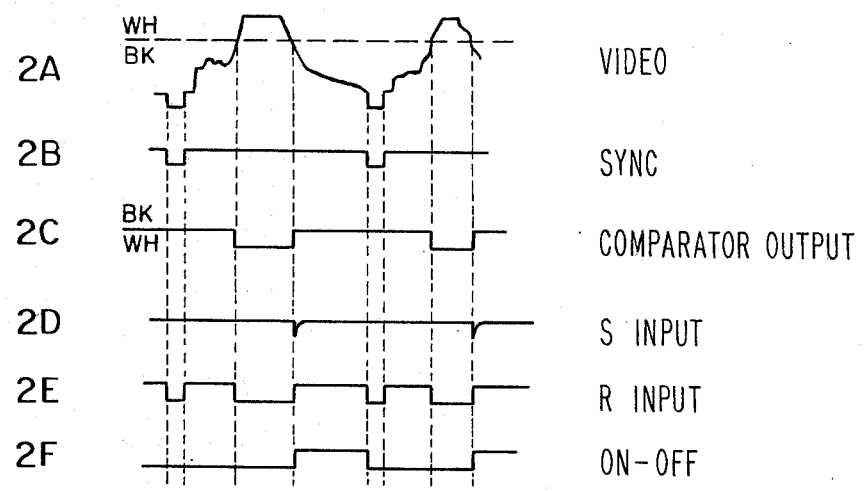
FIG. 2 is a first set of 6 curves illustrating signals generated at different indicated points of the system of FIG. 1.
Figure 3:
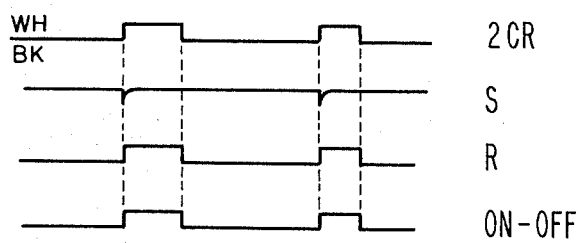
FIG. 3 is a second set of 4 curves similar to the last 4 curves of FIG. 2, but for a reverse polarity as compared to the conditions of FIG. 2.
Figure 4:
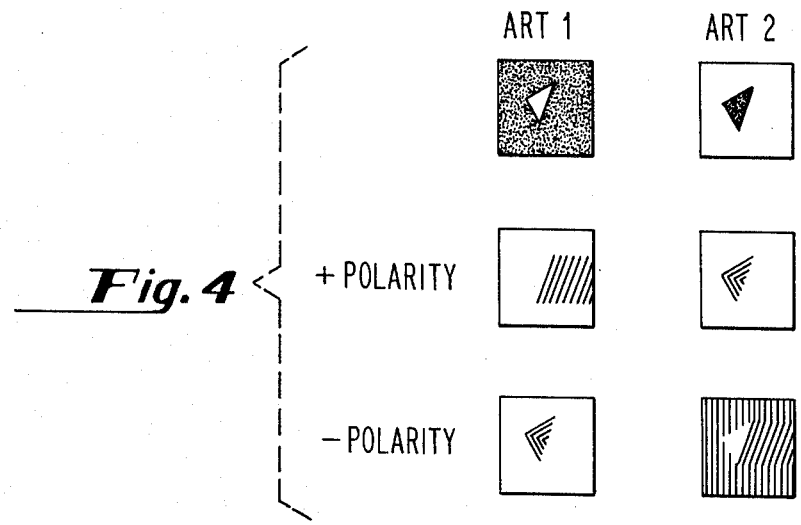
FIG. 4 comprises a set of image representations corresponding to respective image art cards, which illustrates by simple examples the operation of the system of this invention.

Referring now to FIG. 1, there is shown a block diagram which sets forth the components of the system of this invention. A camera 20, or other equipment source, is utilized to generate an image video signal. For example, the camera may be directed at a prepared art card, such that the video signal appearing at 2A, when connected to the input of a television receiver, produces an image such as indicated by ART 1 or ART 2 illustrated in FIG. 3. As will be appreciated after the following discussion, there is no limitation on the video signal derived at 2A, and generally speaking such a signal may represent either a stationary or a moving image. The term "image" as used in this context means any pictoral, graphic, or like representation, and the forms as shown in FIG. 4 are simple image forms utilized solely as illustrations. The image signal is suitably amplified in amplifier 21 and compared to a reference signal in comparator 22. The purpose of comparator 22 is to effectively digitize the video signal, so that the signal at 2C represents a digital, or black-white signal. The reference or comparator level utilized in comparator 22 is selected in accordance with the desired breakpoint between black and white. As seen in FIG. 2, curve 2A is a typical video signal in analog form, and curve 2C represents the digitized version, with the high level representing black and the low level representing white.

It is noted that the digitized video signal may be obtained directly from a storage medium such as video tape, such that the signal at 2C is inputted at that point from an external source. Alternately, the TV frames may be stored in memory, such as video discs or digital memory.

The digitized video signal at 2C is inputted to polarity select circuit 23, which may be operated to produce at its output either the same signal as at 2C, or a reversed polarity signal 2CR. The signal 2CR, as shown in the first curve of FIG. 3, represents a black-white reversal of the digital signal shown in curve 2C. The selected digitized signal is connected to an input select circuit 26, along with other source inputs. Thus, a plurality of camera sources 20 may be incorporated in the system, the operator having the ability to select from time to time the signal which is to be utilized for controlling the generator.

The selected digital video signal is processed to provide input signals to the two input terminals of flip-flop 30. The selected signal is first used to drive pulse generator 27, which suitably consists of a conventional differentiating circuit with any desired amount of amplification. The output 2D, as seen in FIG. 2, comprises a pulse which in this illustration is negative going and corresponds in time to a step up of the digitized control signal. Thus, when the video control signal goes from white to black, for the positive polarity case, the output of the pulse generator at 2D is a negative spike which drops from a high to a low level, or from a 1 to a zero level. Corresponding to negative polarity, as seen in FIG. 3, the generator output is illustrated as appearing when signal 2CR goes from low to high, which corresponds to going from black to white. The signal at 2D, for either polarity, is connected to first terminal S of flip-flop 30.

The output of the select block 26 is also connected to one of the input terminals of combining circuit 28. Combining circuit 28 suitably comprises a NAND circuit 28A followed by an inverter 28B. A second input to the NAND circuit, designated at 2B, is the horizontal sync signal, as shown in the second curve of FIG. 2. The output of combiner 28, shown at 2E in FIG. 1, is connected to the R terminal of flip-flop 30. The output of the combiner circuit 28, as connected to the R terminal of the flip-flop, is illustrated in curve 2E of FIG. 2 for the positive polarity case, and in the third curve of FIG. 3 for the negative polarity case.

Flip-flop 30 is utilized to generate at its output terminal A the ON-OFF signal for control of a video function generator. The truth table for flip-flop 30 is set forth below in Table I:

TABLE I

FLIP-FLOP TRUTH TABLE

| | | PREVIOUS STATE | | | | | | | |
|---|---|---|---|---|---|---|---|---|---|
| | | 0 | 0 | 0 | 1 | 1 | 0 | 1 | 1 |
| S | R | A | B | A | B | A | B | A | B |
| 0 | 0 | 1 | 1 | 1 | 1 | 1 | 1 | 1 | 1 |
| 0 | 1 | 1 | 0 | 1 | 0 | 1 | 0 | 1 | 0 |
| 1 | 0 | 0 | 1 | 0 | 1 | 0 | 1 | 0 | 1 |
| 1 | 1 | * | * | 0 | 1 | 1 | 0 | * | * |

*INDETERMINATE

The action of the flip-flop 30, in combination with the signals as processed and inputted into the flip-flop, produce an ON-OFF signal A, as illustrated in curve 2F of FIG. 2 and the bottom curve of FIG. 3 respectively for the positive and negative polarity cases. The ON-OFF signal is used to control the operation of a video function generator which is synchronized with the image signal, thereby providing the basis for controlling the end result video presentation as a function of the black/white discontinuities of the image, i.e., in accordance with the leading and/or trailing edges of characters within the image.

Referring to FIG. 4, there is illustrated a first image designated ART 1, being a white figure on a black background. In the system of this invention, for positive polarity, a function generator is turned on during each scan whenever there is a transition from white to black, and it is turned off again if there is a subsequent transition from black to white. Since the generator is started at the same point each time it is turned on, there results what is termed a shadow following the slope or configuration of the trailing edge of the white character. For the illustration of FIG. 4, the function generator generates equally spaced parallel vertical lines. However, since the generator is turned on each scan in accordance with the trailing edge of the image, the lines so generated have the same slope as the trailing edge, as seen in the plus polarity representation below ART 1. Conversely, for the negative polarity case, corresponding to the curves of FIG. 3, the function generator is turned on at the transition from black to white, such that it turns on corresponding to the leading edge of the white image of ART card 1. For the negative polarity, the function generator is also turned off following the transition from the white character to the black background.

Still referring to FIG. 4, the results for both positive and negative polarity are also shown corresponding to the art representation designated ART 2 which has the same geometric pattern as ART 1, except that the character is black on a white background. For positive polarity, the digital video signal is the same as for the negative polarity case for ART 1, and consequently the resulting final video patterns are the same. However, for the negative polarity case for ART 2, the blanking or sync pulses come through at the comparator output 2C as distinct signals, resulting in the pattern shown in the lower right hand representation of FIG. 4. In this instance, the generator is turned on at the transition from the sync pulse (which is detected as black by comparator 22) to the white background. Thus, the vertical lines from the function generator come through unaltered until the leading edge of the black character. The generator is turned off by the leading edge of the black character, and is turned on again at the trailing edge of the black character. Thus, in this illustration the shadow trailing the character is the same as for the plus polarity ART 1 case, but the rest of the lines are vertical. It is to be understood that for each polarity, repetitive or additional characters control the generator signal in the same manner, the illustrations in FIG. 4 containing only one character for each art card for purposes of simplifying the illustration. Also, it is to be understood that the generator may be any suitable video generator, and the illustration of a parallel line generator is not limiting in the scope of this invention. Many, many such functions can be generated, producing all sorts of video presentations, both still and moving. Such function generators are well known in the art, and are commercially available.

Referring back to FIG. 1, the use of the video control signal in a larger color video synthesizer is illustrated. The ON-OFF signal is used to turn on and off a selected generator, as designated at block 34. The video generator which is controlled by the control signal may be of a type which resets itself to the same starting point each time it is turned off, so that when it is turned on it starts at the same point in its pattern generation. Alternately, it may be of a type which resets to a new starting point each frame, as is necessary generally for character generation. Block 34 is understood to suitably contain any desired number of generators, such that the output thereof may represent a plurality of controlled video signals. These signals are summed in accordance with predetermined logic in pattern matrix block 35, the output of which is connected to pattern selector and comparator circuit 36. In circuit 36, the inputs from 35 are selected as desired to produce a digital 2-state output signal. By way of illustration, circuit 36 may contain six comparators, each of which can be inputted from any of the plurality of inputs, in order to make up the digitized video output signal. The digitized signal is delivered to the level selection, polarity and erase circuitry 37 which, depending upon operator control, performs the functions of assigning the signal to a given one of a predetermined number of picture levels, and inverting the polarity of any such levels. A signal for each assigned level is connected from the output of circuit 37 to the priority logic circuit block 40, which produces a composite signal arranged such that the signal components corresponding to each predetermined level are gated through or blocked as a function of the level priority. In this manner, a plurality of video signals can be assigned to different levels, with the higher priority levels blocking out lower priority levels. Note also that the digitized video signal 2C or 2CR may be channeled directly through ON-OFF switch 38 to the level selection, polarity and erase circuit 37. The output signal from priority logic circuit 40 is connected to color select circuit 41, which receives a coded signal and which encodes information corresponding to the desired color. The output of circuit 41 is connected to color video generator 42, which produces the final desired color video signal. It is to be noted that whenever color is used in this description, it is meant to include hue, saturation and luminance.

From the above it is seen that the invention provides means to generate patterns having left edges guided by an image control signal. The patterns may be arranged to follow the left or leading edge of the input image and appear inside the image area, or alternately follow the right or trailing edge of the input image and extend from there to the right either to the next part of the image or to the picture edge, whichever comes first. Assuming that the image moves, as can be caused for example by physically moving the art card, the patterns follow. It is noted that the image itself need not be displayed, or may be displayed on one of a plurality of levels.

Reference is made to the following printed materials which have been published by BJA Systems, Inc., and which are incorporated by reference:

1. Instruction Manual, Chromaton 14 Color Video Synthesizer, Maintenance.
2. Instruction Manual, Chromaton 14 Color Video Synthesizer, Operation.

I claim:

1. A system for generating a video display signal which represents a first signal modified as a function of a second separately derived image signal, comprising:
   a. a function generator for generating a predetermined video signal, and being controllable to an on or off operating condition;
   b. an image signal generator for generating an image video signal;
   c. control signal means for generating an on-off control signal from said image video signal; and
   d. means for controlling the operation of said function generator with said control signal.

2. The system as described in claim 1, wherein said control signal means includes a comparator circuit for digitizing said image signal into a black/white digital signal, and a polarity select circuit.

3. The system as described in claim 2, wherein said control signal means comprises a flip-flop circuit which generates an output control signal connected to said function generator, said control signal means further comprising means for inputting a horizontal sync signal into said flip-flop.

4. The system as described in claim 3, wherein said function generator is one of a plurality of function generators, and means for selecting from said plurality the generator which is controlled by said controlling means.

5. The system as described in claim 4, further comprising level means for generating a multi-level video signal, and means for connecting the output of said selected function generator into said level means.

6. The system as described in claim 5, further comprising means for transferring said multi-level video signal into a color video signal.

7. The system as described in claim 6, wherein said image signal generator comprises a TV camera.

8. The system as described in claim 2, wherein said control signal means generates a change in said control signal whenever said image video signal changes from black to white or from white to black.

9. The system as described in claim 6, wherein said image signal generator comprises stored signals.

10. A system for generating a video display signal, comprising:
    a. a function generator for generating a first video signal which represents a predetermined display pattern;
    b. image signal generator means for providing a digitized image signal in synchronization with said function generator signal;
    c. polarity select means for providing said digitized signal with a selected polarity;
    d. pulse generator means for deriving pulses as a predetermined function of said digital signal; and
    e. on-off generator means having an output connected to said function generator means and an input connected to the output of said pulse generator means, for generating a signal for controlling the on-off state of said function generator.

11. The system as described in claim 10, further comprising means for inputting a horizontal sync signal to said on-off means.

12. The system as described in claim 11, comprising a plurality of function generators and means for selectably controlling one of said generators with said on-off signal.

13. The system as described in claim 12, further comprising means for processing the output signal of said selected generator so as to provide a multi-level color video signal.

14. The system as described in claim 10, wherein said image signal generator means comprises means for generating an analog TV image signal, and digitizing means for digitizing said analog signal.

15. A method of generating a video display, comprising:
    a. generating, with an electronic function generator, a video signal carrying information corresponding to a predetermined video pattern;
    b. generating a digitized image video signal carrying information representing a control image; and
    c. controlling said function generator in an off and on state with said image signal.

16. The method as described in claim 15, wherein the step of generating a digitized image video signal comprises producing at least one art card and generating with a television camera a video signal representing the image of said art card.

17. The method as described in claim 16, comprising moving said art card while generating said image video signal, whereby said video display changes in a manner which follows said moving card.

* * * * *